United States Patent
Abert et al.

(10) Patent No.: US 8,264,180 B2
(45) Date of Patent: Sep. 11, 2012

(54) ADJUSTMENT DRIVE OF A MOTOR VEHICLE

(75) Inventors: Carsten Abert, Haβfurt (DE); Helmut Sesselmann, Steinach (DE)

(73) Assignee: Brose Fahrzeugteile GmbH & Co., Coburg (DE)

( * ) Notice: Subject to any disclaimer, the term of this patent is extended or adjusted under 35 U.S.C. 154(b) by 753 days.

(21) Appl. No.: 12/278,139

(22) PCT Filed: Nov. 2, 2006

(86) PCT No.: PCT/EP2006/010510
§ 371 (c)(1),
(2), (4) Date: Dec. 9, 2008

(87) PCT Pub. No.: WO2007/087841
PCT Pub. Date: Aug. 9, 2007

(65) Prior Publication Data
US 2009/0091216 A1    Apr. 9, 2009

(30) Foreign Application Priority Data
Feb. 4, 2006    (DE) ............... 20 2006 001 741 U (51) Int. Cl.
*H02K 29/12* (2006.01)
*H02K 11/00* (2006.01)
*H02K 23/04* (2006.01)
*H02K 21/12* (2006.01)
*H02P 3/00* (2006.01)

(52) U.S. Cl. .............. 318/400.37; 318/492; 318/493; 318/494; 310/68 B; 310/154.15; 310/156.06

(58) Field of Classification Search ............ 318/400.37, 318/492, 493, 494; 310/68 B, 154.15, 156.06
See application file for complete search history.

(56) References Cited

U.S. PATENT DOCUMENTS

| 2,754,464 A | 7/1956 | Wizenez et al. |
| 4,082,968 A | 4/1978 | Jones |
| 4,096,419 A * | 6/1978 | Wren et al. ............... 318/400.23 |
| 4,305,024 A * | 12/1981 | Kuroki ..................... 318/400.41 |

(Continued)

FOREIGN PATENT DOCUMENTS
DE    1538374 A1    6/1969
(Continued)

OTHER PUBLICATIONS

International Search Report for corresponding application PCT/EP2006/010510.

(Continued)

*Primary Examiner* — Walter Benson
*Assistant Examiner* — Gabriel Agared
(74) *Attorney, Agent, or Firm* — Scott T. Weingaertner; Joseph D. Eng, Jr.; King & Spalding LLP (57) ABSTRACT

The invention relates to an adjustment drive of a motor vehicle, wherein the adjustment drive includes a drive motor having a motor magnet that generates a magnetic exciter main field and having a motor armature that is rotatably arranged between a plurality of magnet poles of said motor magnet. The adjustment drive also includes a magneto-sensitive sensor positioned in such a way that during a rotation of the motor armature it senses a change in a magnetic flux density of the exciter main field.

13 Claims, 5 Drawing Sheets

U.S. PATENT DOCUMENTS

| | | | |
|---|---|---|---|
| 4,308,480 A * | 12/1981 | Moody | 310/242 |
| 6,127,752 A * | 10/2000 | Wiesler | 310/68 B |
| 6,225,770 B1 | 5/2001 | Heinrich et al. | |
| 6,867,523 B2 * | 3/2005 | Higuchi | 310/154.15 |
| 7,262,530 B2 | 8/2007 | Becker et al. | |
| 7,755,314 B2 * | 7/2010 | Atarashi et al. | 318/437 |
| 2004/0140724 A1 | 7/2004 | Higuchi | |

FOREIGN PATENT DOCUMENTS

| | | |
|---|---|---|
| DE | 26 38 954 | 3/1978 |
| DE | 42 21 424 | 1/1994 |
| DE | 43 27 217 | 2/1995 |
| DE | 19835091 C1 | 6/1999 |
| EP | 0 524 384 | 1/1993 |
| FR | 2 680 920 | 3/1993 |
| WO | WO 97/02646 | 1/1997 |
| WO | 03/019751 A1 | 3/2003 |

OTHER PUBLICATIONS

Written Opinion of the International Search Authority for corresponding application PCT/EP2006/010510.

* cited by examiner

ADJUSTMENT DRIVE OF A MOTOR VEHICLE

FIELD OF THE INVENTION

The invention relates to an adjustment drive of a motor vehicle having a drive motor and having a magnetic sensor.

BACKGROUND OF THE INVENTION

A sensor system with position sensors and/or direction of rotation sensors is frequently used to detect position, direction of rotation, rotational speed and/or in order to detect a case of trapping of a motor-operated adjustment device of a motor vehicle. Such a sensor system, which operates according to the transmission and reception principle, usually requires, in addition to a receiver in the form of, for example, a Hall sensor or a coil, a transmitter in the form of a magnetic disk or a ring magnet with a number of magnet poles, i.e. with at least one north pole and one south pole.

In the case of a rotating drive or in the case of a linear adjustment such as, for example, an adjustment of the seat, in order to achieve a constant adjustment speed over the adjustment path, stringent demands are frequently made of the resolution of the sensor system in order, in particular in conjunction with a trapping protection system, to permit reaction times which are as short as possible.

For this purpose, DE 198 35 091 C1 discloses a method for performing open-loop and closed-loop control of motor-operated adjustment devices in motor vehicles. In this context, use is made of a sensor system with a signal transmitter which is connected to the drive shaft of a drive motor of the adjustment drive and is in the form of a multi-pole magnet which performs the transmitter function, and with a sensor in the form of a magneto-sensitive element. An electronic unit serves to evaluate the sensor signals.

In an embodiment according to WO 03/019751 A1, a ring magnet which performs the transmitter function is fitted onto the drive shaft of a commutator motor, and a Hall sensor which is connected to an electronic evaluation system is disposed opposite said ring magnet in a contactless fashion. Owing to the Hall effect, the receiver-end sensor supplies, during each revolution of the motor shaft, a number of signal pulses which corresponds to the number of the magnetic poles of the ring magnet which rotates with the motor shaft. By means of the electronic evaluation system which is connected downstream of the sensor it is possible to determine the direction of rotation and the rotational speed and therefore in turn the engine torque by reference to the sequence of individual signal pulses and from the period length and the pulse length. From the latter it is possible in turn to determine the current position of an adjustment element, for example of a window pane, which is moved by the adjustment drive, and also to detect a case of trapping.

In an alternative system in which a DC-fed rod armature motor is generally used, it is possible to evaluate via a current ripple which is caused by the commutation process of the drive motor to determine the rotational speed, direction of rotation and adjustment position.

The invention is based on the object of achieving the highest possible degree of integration of the adjustment drive and sensor system.

This object is achieved according to the invention by means of an adjustment drive of a motor vehicle, having a drive motor which has a motor magnet which generates a magnetic exciter field or exciter main field, and a motor armature which is rotatably arranged between the magnet poles of said motor magnet, in order to increase the integration of a sensor system, in particular in order to detect a position, the direction of rotation, a case of trapping or change in a rotational speed a magneto-sensitive sensor is positioned in such a way that it senses a change in the magnetic flux density of the exciter main field during a revolution of the armature.

Accordingly, the adjustment drive has a drive motor and a sensor which is preferably integrated into its exciter main field. In order to generate the exciter main field, the drive motor preferably comprises a permanent magnet on the stator side and a motor armature which is rotatably arranged expediently between its two magnet poles. The motor armature has a number of armature teeth or poles with armature grooves between them. In principle an electromagnet can also be used as the motor magnet. In an expedient use of a permanent magnet as a motor magnet, the armature teeth are provided with a motor winding which can be energized. The adjustment drive serves to drive an adjustment element of the motor vehicle, in particular of a window pane, of a seat, of a tailgate or of a sunroof.

The magnetic sensor is preferably a Hall sensor. The position of the magnetic sensor is determined by virtue of the fact that it is always subject to the stationary exciter main field. As a result, the sensor already operates at a fixed working point with a corresponding signal base level in the form of the voltage or Hall voltage which can be tapped at the sensor side as a result of the galvano-magnetic effect, of which the Hall effect is an example. During a revolution of the armature of the motor, the sensor detects a change in the magnetic flux density of the exciter main field owing to alternately varying air gap inductions and/or alternately changing magnetic resistances. In other words, on the basis of a signal base level which serves as a working point the sensor also senses changes in a parameter of the magnetic field which is generated by the motor magnet owing to circumferential sections of the motor armature which change in the circumferential direction with alternately changing different magnetic properties.

SUMMARY OF THE INVENTION

The invention is based here on the idea that an increase in the integration of functions of the sensor system for detecting a position or the direction of rotation or changes in a rotational speed can be achieved in an adjustment drive of a motor vehicle if the number of separate functional elements or components for the transmitting and receiving functionalities can be reduced. This in turn can be achieved by virtue of the fact that functionalities or means which are already present in the adjustment drive itself also perform the transmitting or receiving function. A magnetic field which is necessary to generate a receiver-end sensor signal on the basis of the galvano-magnetic effect is already present in the form of the stationary magnetic exciter main field of the drive motor. Accordingly, an additional magneto-sensitive element, in particular the ring magnet which is generally used, could be dispensed with at the transmitter end if a change in a magnetic parameter were present during the operation of the drive motor and this change could be detected.

The invention is then based on the realization that on the basis of the stationary exciter main field which is generated by the motor magnet which is already present, a change in the magnetic field results at least one exposed location owing to a rotational movement of the motor armature. As a result, both in an energized motor armature and in a non-energized motor armature the relative permeability changes with the circumferential sections which change in the circumferential direction, in the form in particular of the armature teeth and armature grooves which alternately pass the exposed location. The reason for this is that the armature teeth as a rule contain iron and therefore partially bring about, at the exposed location, a comparatively large air gap induction with simultaneously low magnetic resistance, while an armature groove which passes the exposed location gives rise to a comparatively small air gap induction with relatively large magnetic resistance. This dynamic and periodic changing of the relative permeability $\mu_r$ leads, according to the relationship $B=\mu_r \cdot (\mu_0 \cdot H)$, to a corresponding change in the magnetic flux density B at the exposed location.

A magneto-sensitive sensor or Hall sensor which is positioned at the exposed location then generates, according to the relationship $U_H \approx I \cdot B$, a sensor signal or Hall voltage signal which, when constant current I flows through the sensor, contains changes in current level and therefore corresponding signal pulses which result from the changes in the magnetic flux density B. The number of signal pulses of the sensor signal corresponds here to the number of armature teeth of the motor armature.

As a result of the arrangement of a magneto-sensitive element at the exposed location, or at each exposed location, a sensor signal which can be evaluated is therefore generated. In this context, the motor magnet, which is embodied as a four-pole permanent magnet with two north poles and two south poles or preferably as a two-pole permanent magnet with one north pole and with one south pole, assumes a double function. The permanent magnet which is already present at the drive motor therefore generates both the stationary magnetic exciter main field and the transmitter function of the transmitting and receiving system within the sensor system.

The signal pulses which are caused by this magnetic pole sensitivity or reluctance result from a basic field strength of the stationary exciter main field and a superposed alternating field with oscillating field strength which changes periodically during each revolution of the armature of the motor. In this context, compared to an additional ring magnet which, in particular for reasons of cost, has only 2 or 4 poles, for making available the transmitter function, the number of signal pulses which can be evaluated per revolution of the armature, that is to say per revolution of the motor armature through a rotational angle of 360°, with a 6-pole or 8-pole drive motor which is already present is comparatively large so that a correspondingly high-resolution sensor system is made available.

In addition, since, as is recognized, when the direction of rotation of the motor armature changes, the signal edge shape of the signal edges or signal pulses of the sensor signal changes, the direction of rotation of the motor can be determined from this alone. Furthermore, the detection of the position of an adjustment element of the motor vehicle which is moved by means of the adjustment drive is therefore already made possible with comparatively high reliability since both the number of signal pulses of the sensor signal and the repetition accuracy thereof is particularly high compared to conventional sensors.

A preferred position of the sensor is an exposed location within the exciter main field which is offset by 90° compared to a commutation zone (neutral area) which is present in a commutation motor. In this context, the sensor can be inserted directly into a corresponding recess or opening within the respective magnet pole. An additional or alternative position of the sensor is in the area between the commutation zone and the magnet pole which is adjacent to it. Furthermore, a plurality of sensors can be positioned at different exposed locations within the adjustment drive.

The respective sensor can be arranged here directly or indirectly within the drive motor and at the respective exposed location of the exciter main field in said drive motor. In order to arrange it indirectly, the sensor is constructed from a sensor element which operates in turn on the basis of the galvano-magnetic effect and a prestressing element which is connected thereto magnetically or in a magnetizable fashion. The prestressing element which is arranged at the exposed location of the exciter main field serves to make available the working point of the sensor which is necessary for the galvano-magnetic or Hall effect. In this context, the respective position of the sensor is preferably as far as possible immediately in the vicinity of the air gap between the magnet poles and the motor armature. In principle, the sensor is thus directly or indirectly subjected to the magnetic exciter field in order to use as effectively as possible the Hall effect, i.e. the charge separation, brought about by the magnetic field, and in particular by its change, of the sensor through which current is flowing.

According to a preferred variant, the sensor is positioned in a field area of the drive motor in that a transverse field component of a magnetic armature transverse field which is generated by the motor armature is superposed on the stationary exciter main field. Depending on the direction of rotation of the motor armature, this transverse field component (offset) is additive or subtractive with respect to the exciter main field. The direction of rotation of the motor armature or of the drive motor can therefore be detected and/or determined easily and reliably from the sign (positive or negative) of the offset, i.e. from the orientation of the transverse field component. The transverse field component or offset should be smaller than 50%, preferably smaller than 20%, of the maximum armature transverse field here.

This variant of the invention is based on the idea that given corresponding positioning of the sensor, referred to below as sensor position, field components of the armature transverse field which is generated by the motor armature are superposed on the exciter main field with different sizes depending on the position. In this context, the armature transverse field itself, i.e. its field strength, is in turn independent of the position but dependent on the armature current. The independence from position on the one hand and the dependence on armature current on the other result in the effect that an additional signal component (offset) which is dependent on the armature current is contained in the sensor signal. Since the armature current is in turn directly proportional to the motor torque of the drive motor, this additional signal component can be used to determine the current motor torque.

The motor torque in turn is a measure of the ease of movement of the drive system and in this context in particular of the adjustment element of the motor vehicle which is driven by the adjustment drive. By means of this additional signal component of the sensor signal it is therefore possible to reliably detect difficulties of movement and in particular trapping situations, and therefore use particularly advantageously for the functionality of a trapping protection system.

In a method for evaluating a sensor signal which is generated during the revolution of the armature of a drive motor and in which each revolution of the motor armature a corresponding number of signal pulses is assigned to the number of circumferential sections of the motor armature which change in the circumferential direction, in particular the number of its armature teeth, the direction of rotation of the motor armature is therefore preferably also determined from the signal edge shape of the signal pulses.

Preferably, in the case of a motor armature which is energized, and therefore through which an armature current flows, a sensor signal is generated which contains a first signal component and a second signal component. The first signal component is generated as a result of a change in a magnetic parameter, in particular owing to a change in the magnetic flux density of the exciter main field. The second signal component is generated as a result of an armature transverse field, in particular a transverse field component of the armature transverse field. This second signal component (offset) is preferably filtered out of the sensor signal in order to determine the current motor torque of the drive motor. The respective transverse field component of the armature transverse field which is present at a corresponding sensor position can preferably also be used to detect the direction of rotation.

DETAILED DESCRIPTION

Corresponding parts are provided with the same reference symbols in all the Figures.

Figure 1:
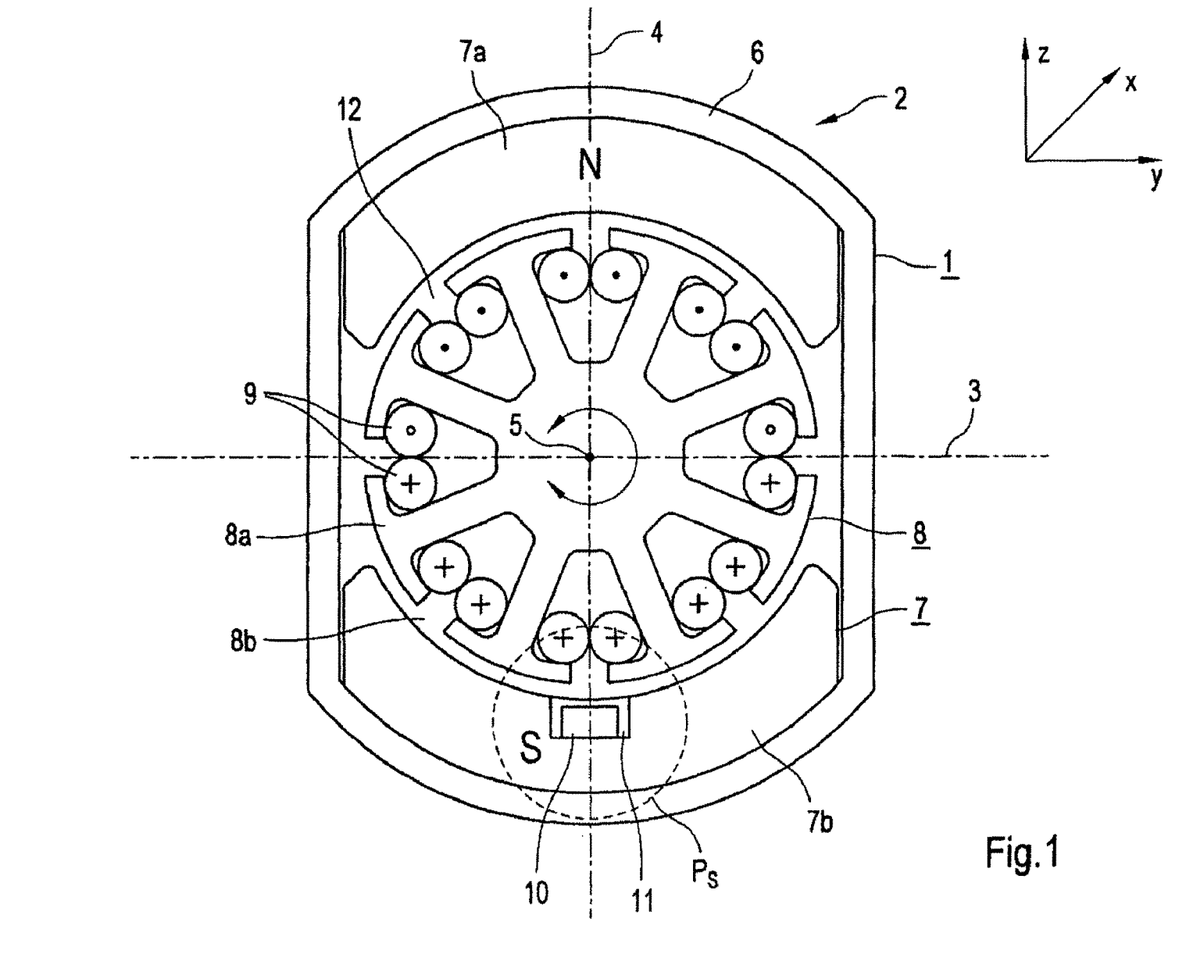
FIG. 1 is a schematic, sectional view of a drive motor of an adjustment drive with integrated sensor system.
Figure 2:
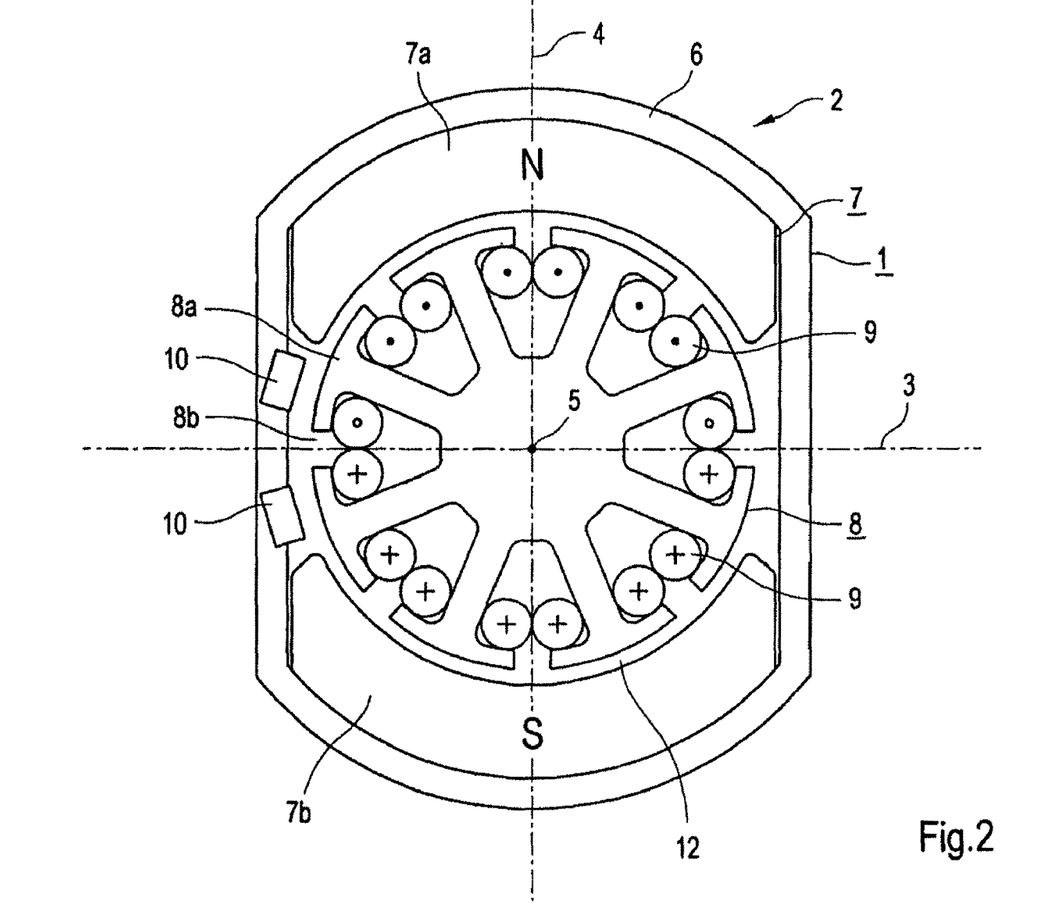
FIG. 2 is a view according to FIG. 1 of sensors which are positioned at an exposed location between a commutation zone and a magnet pole which is at a distance therefrom.
Figure 3:
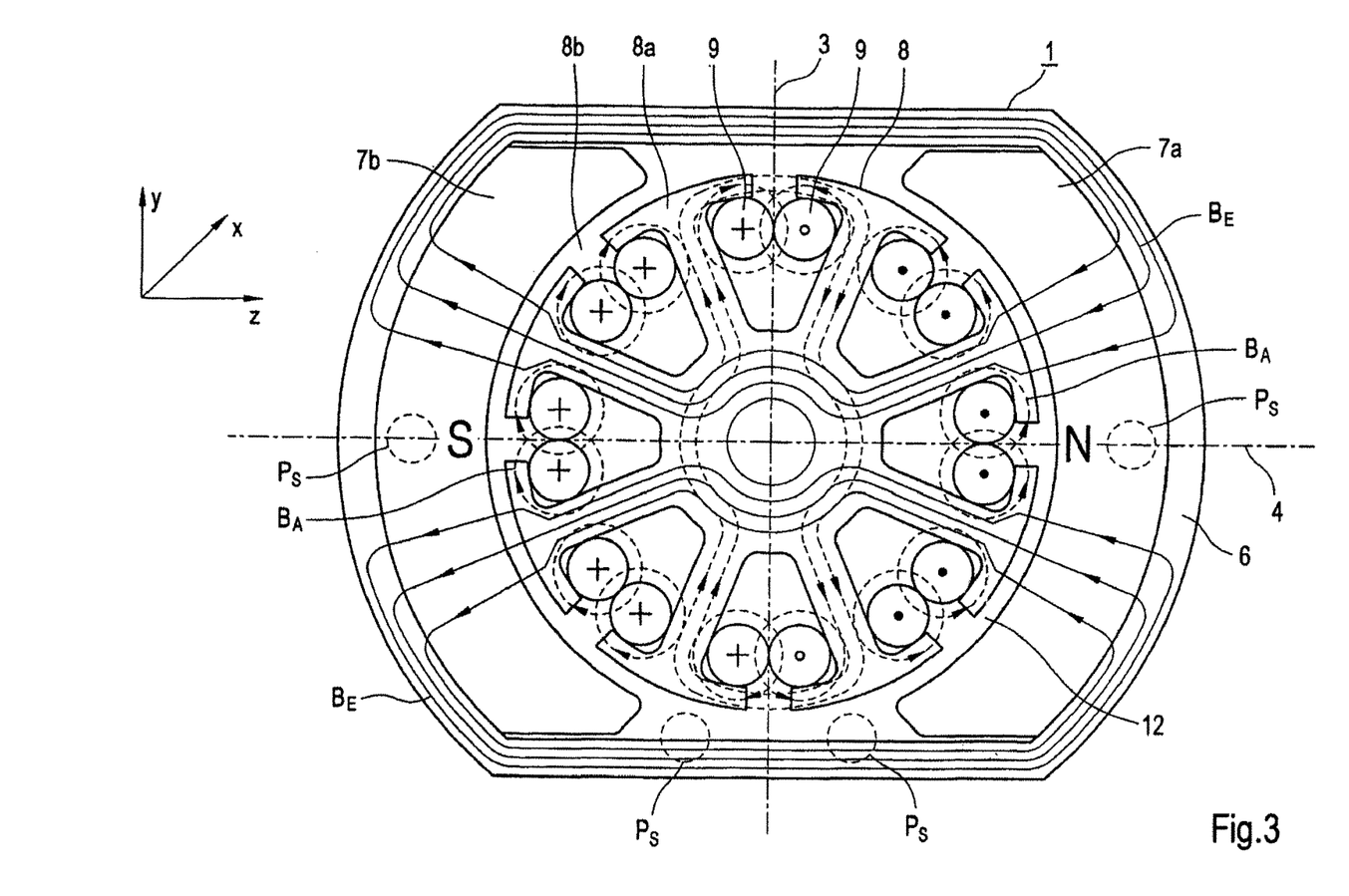
FIG. 3 is a view according to FIG. 1 of the field line profiles of a stationary magnetic exciter main field and of an armature transverse field with the drive motor illustrated rotated through 90°.

FIGS. 1 to 3 show a drive motor 1 as part of an adjustment drive 2 of a motor vehicle. In the central intersection point of a neutral zone 3, illustrated by a dot-dash line and also referred to below as commutation zone, and a dot-dash line 4 which runs perpendicularly thereto a motor shaft or armature shaft, referred to below as drive shaft 5, is seated. The motor shaft or armature shaft extends, according to the illustrated coordinate system, in the X direction and therefore perpendicularly to the plane of the drawing. The commutation zone 3 then extends in the Y direction, while the virtual connecting line 4 between a magnetic north pole N and a magnetic south pole S extends in the Z direction. The drive shaft 5 is coupled (in a way which is not illustrated in more detail) to an adjustment element, for example to a window pane, a seat, a tailgate or a sunroof of a motor vehicle, using coupling elements, for example. The illustrated drive motor 1 forms the adjustment drive 2 of the motor vehicle with the coupling elements which are coupled to the adjustment element.

The drive motor has, within a pole pot 6, a 2-pole motor magnet 7 in the form of a permanent magnet with a north pole (N) 7a and a south pole (S) 7b which is arranged opposite the latter and a motor armature 8 which is arranged so as to be rotatable about the rotational axis which coincides with the armature shaft 5. In the exemplary embodiment, said motor armature 8 in turn comprises eight armature teeth 8a and a corresponding number of armature grooves 8b between them.

The armature teeth 8a are wound with a winding phase or a motor winding 9 which can be energized.

If a current flows through the motor winding 9, the direction of the resulting armature current $I_A$ in the winding sections which are provided with a dot is directed out of the plane of the drawing and therefore in the (+)X direction, while in the case of the winding sections which are provided with a cross the direction of the armature current $I_A$ is into the plane of the drawing and therefore in the (−)X direction.

A sensor system is integrated into the drive motor 1. This system serves to detect the position of the adjustment element which is moved by the drive motor 1 and to detect the direction of rotation of the motor armature 8. In addition, the sensor system serves to sense or determine the rotational speed of the motor and is additionally suitable for determining the motor torque and in particular changes in said motor torque.

For a transmitting and receiving functionality of the sensor system, a magneto-sensitive sensor 10 which carries out the receiver functionality is provided as a separate component. In contrast, a separate component is not necessary for the transmitter functionality. Instead, the transmitter functionality is made available essentially by the stationary magnetic exciter main field $B_E$ which is shown in FIG. 3 and which is generated by the motor magnet or permanent magnet 7 while saving an additional component.

According to FIG. 3, the direction-oriented profile of the exciter main field $B_E$ shows exposed locations or suitable sensor positions $P_S$. FIG. 1 shows a preferred sensor position $P_S$ within one of the magnet poles 7a, 7b using the example of the sensor 10 which is positioned in the vicinity of the south pole 7b. The sensor 10 is arranged in a recess or opening 11 which, in the exemplary embodiment, opens into an air gap 12 which is formed between the motor armature 8 and the magnet poles 7a and 7b. The positions $P_S$ which are illustrated in FIG. 1 for the sensor 10 within the magnet poles 7 and 7b, respectively, is offset by an angle of 90° with respect to the commutation zone 4.

Alternative positionings of the sensor 10 are shown in FIG. 2. In the Figure, a sensor 10 is respectively arranged in an area between the commutation zone 3 and the magnet poles 7a and 7b, at a distance therefrom, of the permanent magnet 7 which, as it were, forms the stator of the drive motor 1. Positioning of the sensor 10 or of each sensor 10 directly in the vicinity of the commutation zone 4 is also possible.

With regard to the explanation of the method of functioning of the sensor system which is integrated into the adjustment drive 2 and in turn into the drive motor 1 there it is assumed below that the sensor 10 is a Hall sensor. In this context, the physical Hall effect is used as one of the galvano-magnetic effects which occur in a conductor which is located in the (homogenous) magnetic field through which a current flows.

Because the sensor 10 is preferably arranged in the proximity of the magnetic exciter main field $B_E$, the Hall effect results in charge separation or charge shifting in the sensor 10 through which a sensor current $I_S$ flows. The Hall voltage $U_H$ which can as a result be tapped at the sensor 10 is, according to the relationship $U_H \approx I_H \cdot B$, directly proportional to the exciter main field $B_E$ given a constant sensor current $I_S$.

When the motor armature 8 is not rotating and is therefore stationary, the Hall voltage $U_H$ which is generated by the sensor 10 which is integrated into the drive motor 1 is at least approximately constant. During a revolution of the motor armature 8, the armature tooth 8a and armature groove 8b pass the fixed sensor 10 in an alternating or successive fashion. The armature teeth 8a and the armature grooves 8b form here circumferential sections of the motor armature 8 which change in the direction of rotation or circumferential direction 13 (FIG. 1) with alternatingly changing different magnetic properties. These in turn result from various relative permeabilities $\mu_r$ of the iron-containing armature teeth 8a and of the armature grooves 8b. Their relative permeability $\mu_r$(air) corresponds to that of air, while the relative permeability $\mu_r$(Fe) corresponds to that of iron.

In other words: if an armature tooth 8a is located opposite the motor magnet 7 and the sensor 10, this gives rise to a comparatively or relatively large air gap induction and thus to a low magnetic resistance in the vicinity of the air gap 12. If an armature groove 7b is located opposite the magnet 7 and the sensor 10, the air gap induction is comparatively small and the magnetic resistance in the vicinity of the air gap 12 is correspondingly comparatively large.

According to the physical relationship $B=\mu_r \cdot (\mu_0 \cdot H)$, where H is the magnetic field strength and $\mu_0$ is the permeability of air, the magnetic flux density B changes proportionally with the relative permeability $\mu_r$. The corresponding change $\Delta B$ in the magnetic flux density B is sensed by the sensor 10. The corresponding sensor signal S therefore contains a number of signal pulses $S_I$ which corresponds to the number of armature teeth 8a or of armature grooves 8b during a revolution of the armature, i.e. during a complete revolution of the motor armature 8 through an angle $\alpha$ of 360°.

Figure 6:
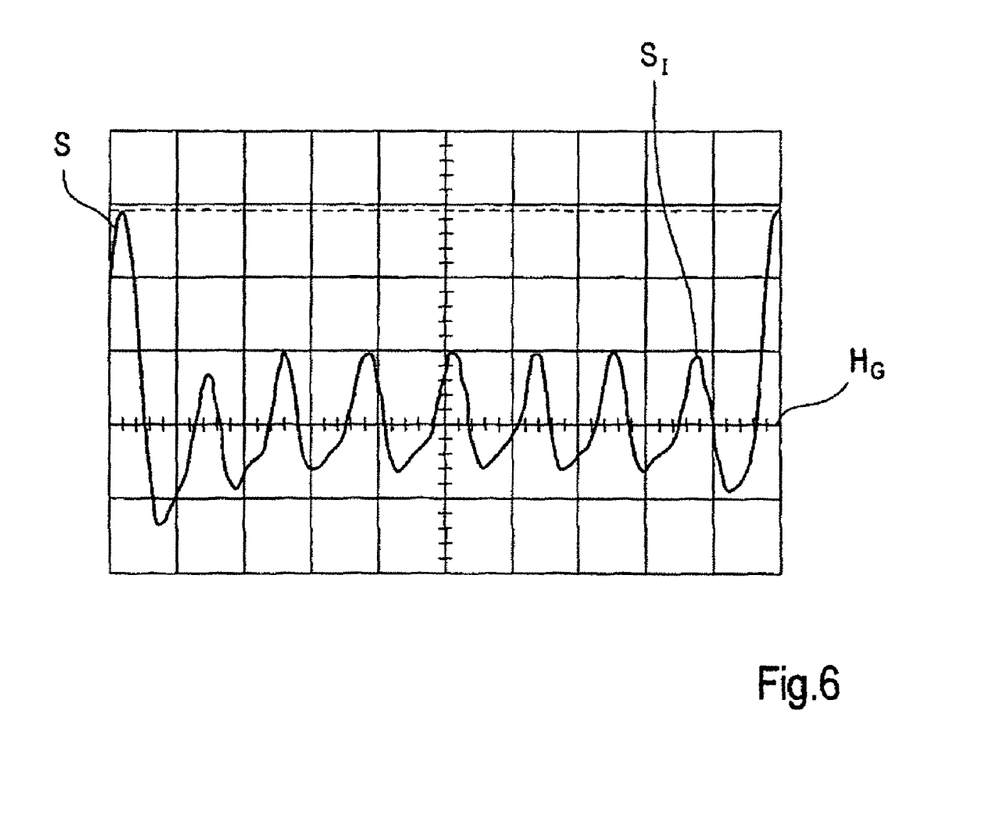
FIG. 6 shows the signal profile by means of a field strength measurement for determining the fluctuation in flux in an 8-groove motor armature with different levels of the induction amplitudes.

Such a sensor signal is illustrated in FIG. 6 for an 8-pole or 8-groove motor armature 8. The illustration according to FIG. 6 is based here on a basic field strength $H_G=B_E(\mu_r \cdot \mu_0)^{-1}$ of, for example, 120 mT with superposed alternating field $\Delta B$ for a rotating motor armature 8.

Figure 5:
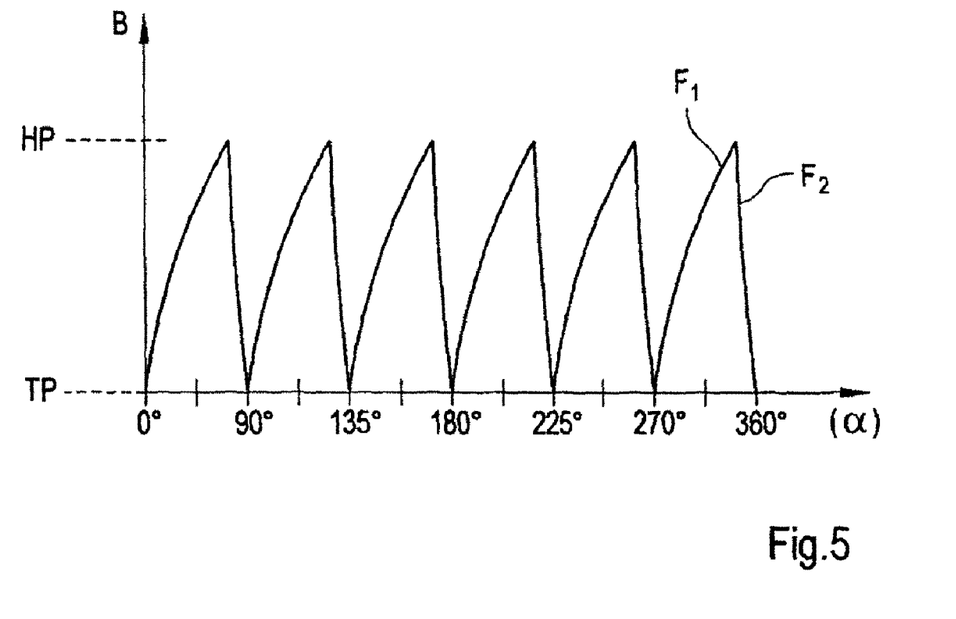
FIG. 5 shows the induction profile of a 6-groove motor armature in a flux density/rotational angle diagram.

FIG. 5 illustrates a corresponding theoretical induction profile for the detection of a magnetic ripple for a 6-groove motor armature 8. A high level HP and a low level TP which alternate as a function of the rotational angle are shown therein in a flux density (B)/rotational angle (°) diagram. The high levels HP occur when an armature tooth 8a passes the sensor 10. Analogously, the low level TP occurs when an armature groove 8b passes the sensor 10. The signal edge shape of the illustrated pulses is representative of the direction of rotation 13 of the motor armature 8. In this context, the front signal edge shape $F_1$ represents right-handed running of the motor armature 8, while the rear signal edge shape $F_2$ represents left-handed running of the armature motor 8.

The illustrated generation of the sensor signal S is independent of whether or not the motor armature 8 is energized. The reason for this is that owing to the effect of the constantly present stationary magnetic exciter main field $B_E$ a sensor signal S is also generated when the motor armature 8 is not energized but is rotating. Such a rotational movement of the motor armature 8 can occur, for example, as a result of the fact that the respective adjustment element of the motor vehicle is moved and consequently a corresponding external force is exerted on the drive motor 1 via the force coupling, and therefore of the uninterrupted force flux.

This effect can consequently be used as a safety option if the adjustment element which is normally driven by the drive motor 1 is moved manually and consequently a sensor signal S is generated owing to the rotation of the motor armature 8 even though at the same time a control instruction to energize the drive motor 1 is not present. This is the case, for example, when there is an undesired external effect as a result of the lowering of the vehicle window, driven by the drive motor 1, of the corresponding adjustment drive 2. An electronic system which is connected to the sensor 10 recognizes this manual intervention and can, for example, trigger a mechanical, optical or audible protective reaction.

The stationary, permanent magnetic exciter main field $B_E$ and the change in the magnetic flux density $\Delta B$ and/or the variable magnetic resistance of the armature tooth 8a and armature groove 8b give rise to magnetic pole sensitivity. This in turn permits continuous evaluation of the position, of rotational speed or of a fluctuation in the rotational speed and evaluation or determination of the direction of rotation 13 of the motor armature 8.

Owing to the frictionally engaging coupling of the drive motor 1 to the adjustment element of the motor vehicle via its motor armature 8 it is therefore possible to detect a case of trapping in the vicinity of the adjustment element when there is a corresponding or instantaneous change in the signal frequency or period length of the sensor signal S. In this context, there is no need for an additional (magnetic) transmitter since the permanently available exciter main field $B_E$ and the permanently present pole sensitivity are used to generate signals when the motor armature 8 is energized or when it is not energized.

Exposed sensor positions $P_S$ are locations at which the stationary permanently magnetic exciter main field $B_E$ which is defined in the direction of flux and a non-stationary dynamic armature transverse field $B_A$ which continuously changes its direction of flow in the vicinity of the neutral zone 3 or commutation zone 3 do not influence one another, or only do so to a small degree. The corresponding physical relationships and the exposed sensor positions $P_S$ are illustrated in FIG. 4.

Figure 4:
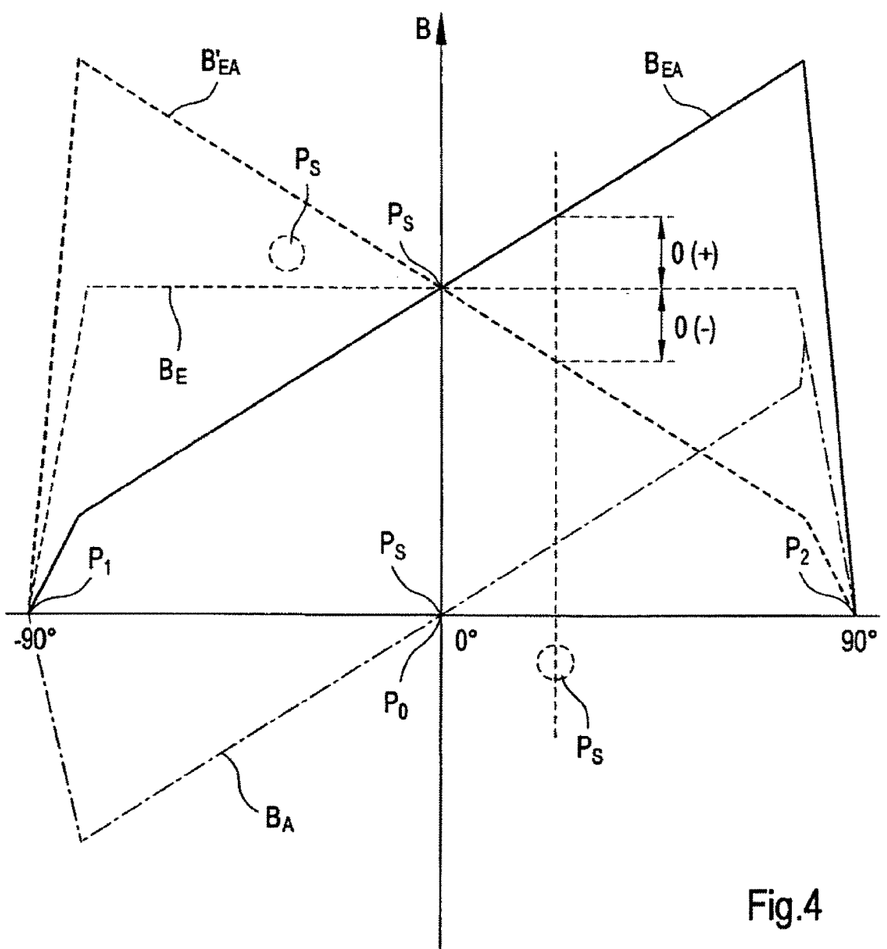
FIG. 4 shows the superposition of the armature transverse field and exciter main field in a flux density/rotational angle diagram.

Here, FIG. 4 shows the profile of the stationary exciter main field $B_E$ by means of dashed lines in a flux density/angle diagram between $(-)90°$ and $(+)90°$. Furthermore, the armature transverse field $B_A$ is illustrated by dot-dash lines when the motor armature 8 is energized. The superposition of the armature transverse field $B_A$ and the stationary exciter main field $B_E$ is illustrated in the form of an unbroken sum line or superposition line denoted by $B_{EA}$. The unbroken sum line or superposition line which is denoted by $B_{EA}$ represents here a first direction of rotation of the motor armature 8 or of the drive motor 1, while the mirrored sum line or superposition line which is represented by dashes and is designated by $B'_{EA}$ then represents the opposing direction or second direction of rotation.

It is clear that at the location of the zero point $P_0$ the armature transverse field $B_A$ is virtually absent ($B_A(P_0)=0$) and increases approximately linearly and with reversed signs toward the angular positions at $P_1(-90°)$ and respectively at $P_2(+90°)$. In the region of the 0° point $P_0$ the influence of the armature transverse field $B_A$ is accordingly virtually absent, while said influence also increases in the direction of increasing absolute values of degrees angle.

This effect can then be used to permit a certain influence of the armature transverse field $B_A$ on the sensor position $B_S$, which is illustrated by the circular representations which are represented by dashed lines in the second and fourth quadrants of the diagram according to FIG. 4. In addition to the exciter main field $B_E$, a transverse field component $B_Q$ of the armature transverse field $B_A$ can be detected by the sensor 10 at these sensor positions $P_S$. Since the armature transverse field $B_A$ is dependent on the strength or the absolute value of the armature current $I_A$, a corresponding change in the armature transverse field $B_A$ can consequently also be detected over the corresponding transverse field component $B_Q$. These changes or fluctuations in the transverse field component $B_Q$ are reflected as a separate signal component $S_A$ in the sensor signal S of the sensor 10. Since this transverse field component $B_Q$ behaves additively or subtractively with respect to the exciter main field $B_E$ depending on the direction of rotation of the motor armature 8 at the sensor position $P_S$, the first direction of rotation of the motor armature 8 leads to a positive offset O(+), while the opposing direction leads to a negative offset O(−). This is illustrated in the first quadrant of the diagram in FIG. 4. This effect can be used to detect or determine the direction of rotation of the drive motor 1.

The (second) signal component $S_A$ can be filtered out— also as an offset O(±)—from the sensor signal $S_{EA}$ which contains the further (first) signal component $S_E$ owing to the exciter main field $B_E$ which changes during a revolution of the motor armature 8. This second signal component $S_A$ can be used to determine the current motor torque and/or to detect the direction of rotation by virtue of the proportionality between the armature current $I_A$ and the motor torque M of the drive motor 1.

A changing motor torque M in turn reflects the degree of ease of movement of the adjustment drive 2. Consequently, difficulties of movement of the adjustment element of the adjustment drive 2 can be detected and evaluated by means of this additional (second) signal component $S_A$. Therefore, in particular difficulties of movement of the adjustment element of the adjustment drive 2 can be sensed, in particular both qualitatively and quantitatively. This is in turn particularly advantageous for the detection of a case of trapping, especially since such a case of trapping can be a specific case of difficulty of movement of the adjustment element of the adjustment drive 2.

The sensor position $P_S$ in the vicinity of the neutral zone or commutation zone 3 provides the advantage that the armature current $I_A$ in the commutating current phase changes the direction of current when it passes through the zone 3 which is neutral in terms of the magnetic field H. This effect causes a fluctuation in the magnetic flux or the magnetic flux density B which can be used to generate the sensor signal S. When the current passes through the neutral zone 3, the direction of the magnetic flux and therefore the magnetic polarity changes with respect to this part of the armature transverse field $B_A$ in the armature teeth 8a of the energized motor armature 8 which pass through the sensor position $P_S$ there as a result of the change in current (commutation). This change in polarity can be used to detect the direction of rotation 13 of the motor armature 8.

A further effect is that when the polarity of the current changes as a result of the commutation, the magnetic polarity in the winding phase of the armature winding 9 changes. A precise assignment of the direction of the armature current $I_A$ and the direction of rotation 13 of the motor armature 8 owing to the direction-dependent signal edge shape of the sensor signal S then permits a correspondingly precise assignment of the magnetic polarity with respect to the direction of rotation 13.

In addition, the right-handed running and left-handed running and therefore the direction of rotation 13 of the motor armature 8 can be sensed by means of the flux amplification which alternates with the rotation of the motor armature 8 and the attenuation of the flux as a result of the armature transverse field $B_A$ and as a result of its direction of flux in the case of right-handed and respective left-handed running at the sensor position $P_S$ by virtue of the different flux densities B. The Hall sensor 10 detects, as a sensor element which is magneto-sensitive to changes in the magnetic flux density B, for example right-handed running in the sequence north-south pole and left-handed running of the motor armature 8 in the sequence south-north pole. Right-handed running or left-handed running of the motor armature 8 can therefore be detected by means of the amplitude shape of the rising and falling signal edge illustrated in FIG. 5 and therefore by means of the signal edge shape $F_1$ or $F_2$ and/or by means of the rise in the signal edge.

Owing to the armature transverse field $B_A$ which changes in the neutral zone 3 and to sensors 10 which are actuated by the exciter main field $B_E$, actuated sensors 10 can also be combined and/or connected to one another to provide improved acquisition of signals.

The sensor 10 or each sensor 10 which performs the receiver functionality of the sensor system can also be positioned outside the pole pot 6 of the drive motor 1. In addition, in a way which is not illustrated in more detail, the sensor 10 can be arranged at an exposed position $P_S$ of the drive motor 1 through an opening in the pole pot 6.

If the sensor 10 is arranged outside the pole pot P, said sensor 10 is constructed (in a way which is not illustrated in more detail) from a sensor element which is arranged inside or outside the pole pot P and a magnetic or magnetizable prestressing element (prestressing magnet) which is connected thereto. The prestressing element which is embodied, for example, as a prestressing magnet serves, when it is subjected directly to the exciter main field $B_E$, to determine or define indirectly the working point of the sensor 10 which is necessary for the Hall effect. As a magnetic prestressing element it can itself additionally or alternatively define the working point directly.

The inventive integration of the sensor system with the sensor 10 into the drive motor 1 of the adjustment drive 2 preferably provides a saving in terms of components, especially since an additional element is not necessary to make available the transmitter/receiver functionality. In addition, it is possible to count the signal pulses $S_I$ even when the motor armature 8 is not energized. In addition, compared to a conventional sensor system, a comparatively large number of signal pulses $S_I$ is available in the sensor signal S at each revolution of the motor armature 8. This in turn increases the resolution of the sensor system and therefore the reliability of the adjustment drive 2 with respect to the desired detection of a position, of the direction of rotation, of a case of trapping and/or of a change in the rotational speed.

What is claimed is:

1. A method for evaluating a sensor signal that is generated during rotations of a motor armature of a drive motor, wherein the motor armature is configured to permit flow of an armature current therethrough, and the drive motor comprises a motor magnet that generates a magnetic exciter main field, wherein the sensor signal comprises a first signal component that is generated as a result of a change in magnetic flux density of the magnetic exciter main field, and a second signal component that is generated as a result of a transverse field component of an armature transverse field at a sensor position and that is dependent on the absolute value of the armature current, the method comprising     filtering out the second signal component from the sensor signal in order to determine the current motor torque of the drive motor, and     assigning each rotation of the motor armature a number of signal pulses that corresponds to a number of armature teeth.

2. The method according to claim 1, wherein the direction of rotation of the motor armature is determined from a signal edge shape of the sensor signal.

3. The method according to claim 1, wherein the direction of rotation of the motor armature is determined from the orientation of the transverse field component.

4. The method according to claim 1, wherein an offset that occurs as a result of the transverse field component of the armature transverse field is used to determine direction of rotation, wherein a first direction of rotation of the motor armature is detected when there is a positive offset, and a second direction of rotation that is opposite the first direction of rotation detected when there is a negative offset.

5. An adjustment drive of a motor vehicle, the adjustment drive comprising a drive motor comprising
- a motor magnet that generates a magnetic exciter main field,
- a motor armature that is rotatably arranged between the magnet poles of the motor magnet,
- a device for evaluating a sensor signal that is generated during rotations of a motor armature of the drive motor, the device comprising a magneto-sensitive sensor that corresponds to the drive motor and that is configured to detect a change in magnetic flux density, a change in the magnetic resistance, and/or a change in induction,
wherein, when the armature current flows through the motor armature, the signal that is generated by the sensor contains a first signal component that is generated as a result of a change in magnetic flux density of the magnetic exciter main field, and a second signal component generated as a result of a transverse field component of an armature transverse field at a sensor position and that is dependent on the absolute value of the armature current.

6. The adjustment drive according to claim 5, wherein the magneto-sensitive sensor is configured to detect a change in the magnetic flux density of the exciter main field during a rotation of the motor armature.

7. The adjustment drive according to claim 5, wherein, at each rotation of the armature, the sensor generates a signal comprising a number of signal pulses that corresponds to the number of armature teeth.

8. The adjustment drive according to claim 5, wherein the sensor is positioned in a field area in which a transverse field component of a magnetic armature transverse field that is generated by the motor armature is superposed on the exciter main field.

9. The adjustment drive according to claim 5, wherein adjustment drive is configured such that the transverse field component of the maximum armature transverse field is less than 50% of the maximum armature transverse field at the position of the sensor.

10. The adjustment drive according to claim 5, further comprising a sensor through which a current flows, which sensor is configured to detect a change in a signal level resulting from different magnetic resistances as circumferential sections of the motor armature alternately pass by during rotation of the motor armature.

11. The adjustment drive according to claim 5, wherein the sensor is arranged within the drive motor on the pole side of an air gap which is formed between the magnet pole and the motor armature.

12. The adjustment drive according to claim 5, wherein the sensor is positioned between a commutation zone of the drive motor and one of the magnet poles of the motor magnet.

13. A motor vehicle comprising the adjustment drive according to claim 5.

* * * * *